(12) United States Patent
Petridis et al.

(10) Patent No.: US 7,992,541 B2
(45) Date of Patent: Aug. 9, 2011

(54) SYSTEM AND METHOD FOR CONTROLLING AUTO-IGNITION

(75) Inventors: Themi Philemon Petridis, London (GB); Ludwig Stump, Gladbach (DE); Jens Wojahn, Cologne (DE); Martin Wirth, Remscheid (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1548 days.

(21) Appl. No.: 11/376,519

(22) Filed: Mar. 14, 2006

(65) Prior Publication Data

US 2007/0215106 A1  Sep. 20, 2007

(51) Int. Cl.
*F02D 13/00* (2006.01)
*F02D 13/02* (2006.01)

(52) U.S. Cl. .................................... 123/347; 123/90.15

(58) Field of Classification Search .................. 123/345, 123/346–348, 90.15, 90.12, 90.17, 315, 432, 123/299, 304, 300; 701/101
See application file for complete search history.

(56) References Cited

U.S. PATENT DOCUMENTS

| | | | |
|---|---|---|---|
| 4,802,448 A | 2/1989 | Ableitner | |
| 5,036,807 A | 8/1991 | Kaneko | |
| 5,117,787 A | 6/1992 | Speil | |
| 6,085,716 A | 7/2000 | Kampichler et al. | |
| 6,213,086 B1 * | 4/2001 | Chmela et al. | 123/276 |
| 6,390,054 B1 * | 5/2002 | Yang | 123/295 |
| 6,752,123 B2 * | 6/2004 | Unger et al. | 123/305 |
| 7,308,872 B2 * | 12/2007 | Sellnau et al. | 123/90.16 |
| 2004/0182359 A1 * | 9/2004 | Stewart et al. | 123/295 |

FOREIGN PATENT DOCUMENTS

| | | |
|---|---|---|
| DE | 10134890 | 2/2003 |
| EP | 0916017 | 3/2002 |
| GB | 2232737 | 12/1990 |

* cited by examiner

*Primary Examiner* — Mahmoud Gimie
(74) *Attorney, Agent, or Firm* — Allan J. Lippa; Alleman Hall McCoy Russell & Tuttle LLP (57) ABSTRACT

A method controlling combustion modes of an engine with at least a first and second cylinder, the engine having a first actuator configured to control at least intake valves of the first and second cylinder and a second actuator configured to control at least exhaust valves of the first and second cylinders, the method comprising of sending a first signal to the first actuator which adjusts operation of at least intake valves of the first and second cylinder and a second signal to the second actuator which adjusts operation of at least exhaust valves of the first and second cylinder, said first and second signals sent at different crank angles, and transitioning combustion modes of said first and second cylinders, said combustion modes including spark ignition and homogeneous compression ignition.

14 Claims, 8 Drawing Sheets

SYSTEM AND METHOD FOR CONTROLLING AUTO-IGNITION

BACKGROUND AND SUMMARY

Engines may use various combustion modes across different operating conditions to improve overall engine performance. Some of the different modes may require different cylinder valve operation, such as different valve timing and/or lift. For example, spark ignition (SI) combustion may be used under some conditions with a first cylinder valve operation, while controlled auto-ignition (CAI), or homogeneous charge compression ignition (HCCI), may be used under other conditions. In still another example, the cylinder may be operated without combustion, such as in a cylinder deactivation mode.

One approach to control the timing of various cylinder valve actuators to control a transition among modes (e.g., from a combustion mode to a non-combustion mode) is described in U.S. Pat. No. 5,408,966. In this example, a hydraulic actuator may be used for each cylinder of the engine to control operation of intake and exhaust valves. Specifically, the controller directs a valve to operate to begin deactivation of a selected cylinder during a predetermined intake event and the mechanism completing the deactivation by a time not later than the beginning of the next exhaust event.

The inventors herein have recognized disadvantages with such an approach. In particular, since a separate actuator is provided for each cylinder, the signal window for sending a transition signal may be limited to achieve a desired deactivation sequence between the intake and exhaust valves. And, if applying such a system to a system using cam profile switching between high and low lift profiles to enable HCCI operation, for example, such a system may have limited applicability due to the variation in timing constraints between different lift profiles (especially at high speeds, the intake valve opening time may be extremely small), and due to the limitations on the intake/exhaust valve switching order.

Thus, in one approach a method is proposed for controlling combustion modes of an engine with at least a first and second cylinder, the engine having a first actuator configured to control at least intake valves of the first and second cylinder and a second actuator configured to control at least exhaust valves of the first and second cylinder. The method comprises sending a first signal to the first actuator which adjusts operation of at least intake valves of the first and second cylinders and a second signal to the second actuator which adjusts operation of at least exhaust valves of the first and second cylinders, said first and second signals sent at different crank angles; and transitioning combustion modes of said first and second cylinders, said combustion modes including spark ignition and homogeneous compression ignition.

In this way, it is possible to take into account an engine firing order and utilize an actuator for adjusting valves of multiple cylinders. This can result in an increased window of switching valve operation. Further, it is possible to have independent control of intake and exhaust valves, for example.

DETAILED DESCRIPTION

Figure 1:
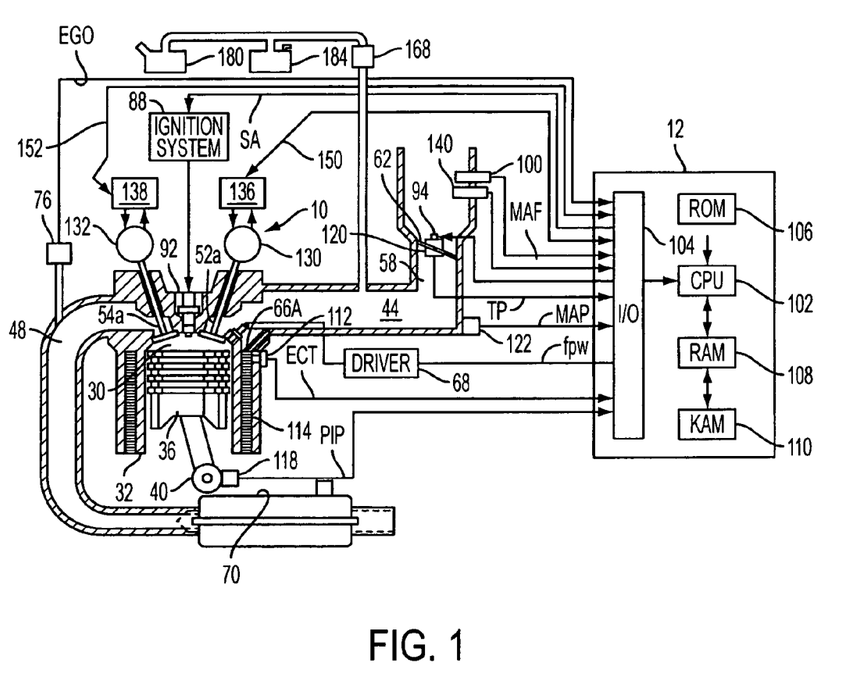
FIG. 1 shows an example engine cylinder configuration.

FIG. 1 shows one cylinder of a multi-cylinder engine, as well as the intake and exhaust path connected to that cylinder. Continuing with FIG. 1, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). Combustion chamber, or cylinder, 30 is shown communicating with intake manifold 44 and exhaust manifold 48 via respective intake valves 52a and 52b (not shown, see FIG. 2), and exhaust valves 54a and 54b (not shown, see FIG. 2). Fuel injector 66A is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assist, as explained in more detail below. Further, in an alternative embodiment, the combustion chamber has no spark plug.

Controller 12 may be configured to cause combustion chamber 30 to operate in various combustion modes, as described herein. The fuel injection timing may be varied to provide different combustion modes, along with other parameters, such as EGR, valve timing, valve operation, valve deactivation, etc.

Emission control device 70 is shown downstream of exhaust manifold 48. The device may be a three way catalyst, NOx trap, various other devices, or combinations thereof.

FIG. 1 further shows a vapor recovery system enabling recovery of fuel vapors from fuel tank 180 and fuel vapor storage canister 184 via purge control valve 168.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 1, engine 10 is shown with an intake camshaft 130 and an exhaust camshaft 132, where camshaft 130 actuates both intake valves 52*a,b* and camshaft 132 actuates both exhaust valves 54*a,b*. The valves can be actuated via lift profiles (see FIG. 2) on the camshafts, where the lift profiles between the different valves may vary in height, duration, and/or timing. However, alternative camshaft (overhead and/or pushrod) arrangements could be used, if desired.

Figure 2A:
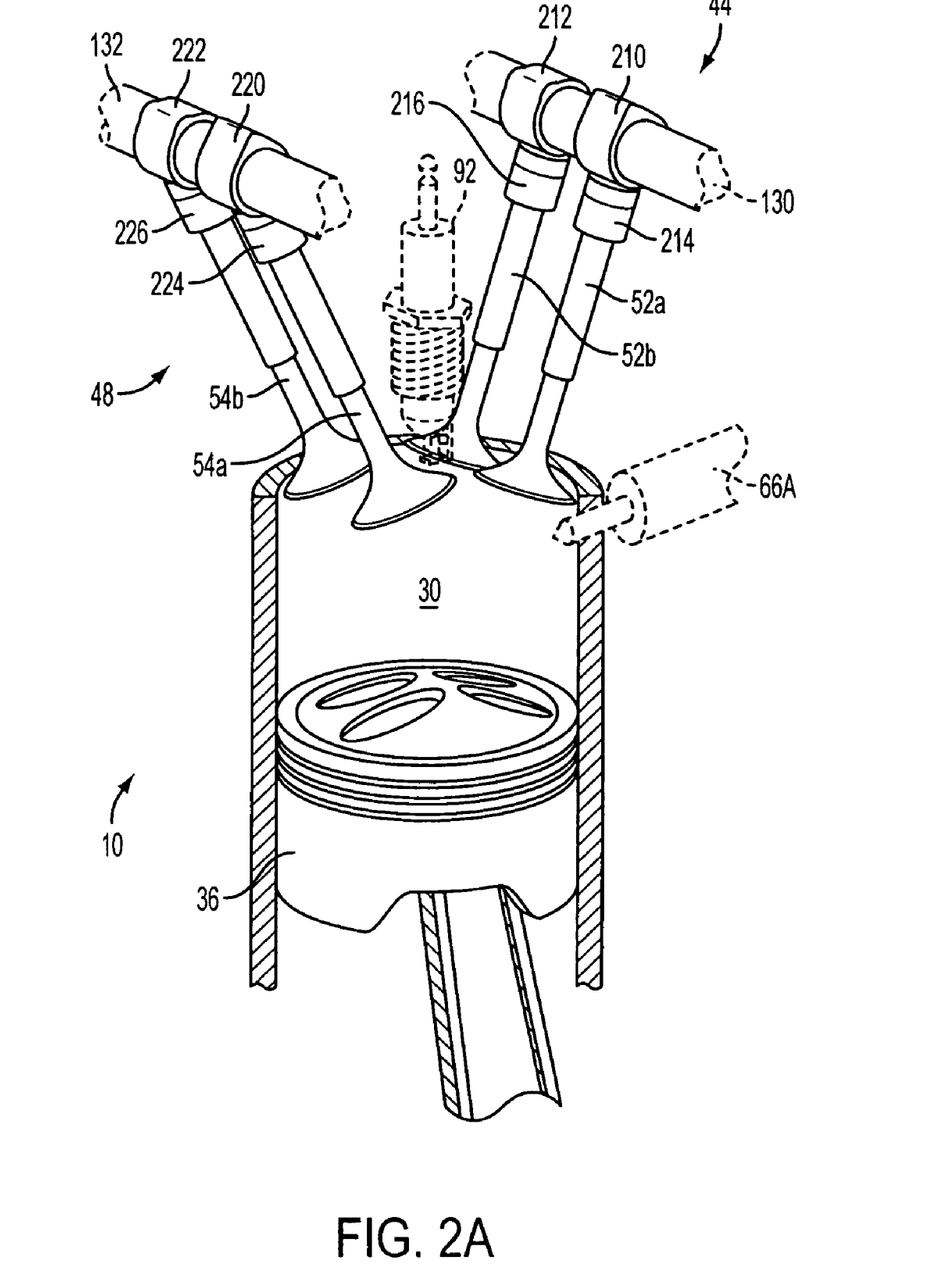
FIGS. 2A-B show a detailed view of example combustion chambers.
Figure 2B:
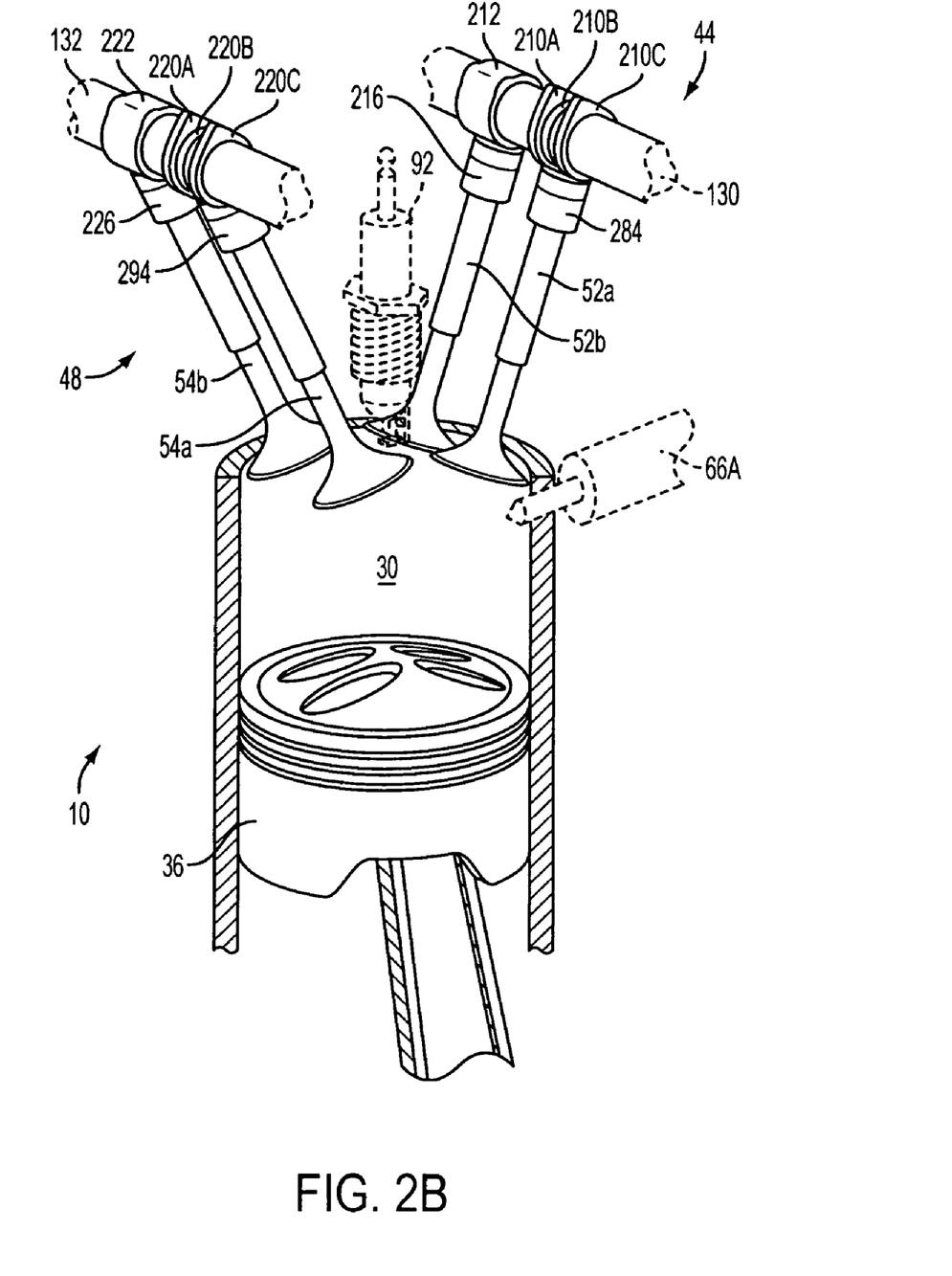

In one embodiment, which will described in more detail with regard to FIG. 2A, a deactivatable tappet may be used in the valve stem of one or more of the intake and exhaust valves 52 and 54 to provide individual valve deactivation under selected operating conditions. In this example, the tappet may have a lost motion action, for example. However, FIG. 2B shows an alternative example in which an alternative deactivatable tappet is shown in which only a portion of the tappet is deactivated. Further, in one example, the cam timing may be varied via actuators 136 and 138, based on operating conditions. The actuators may be hydraulically powered, or electrically actuated, or combinations thereof. Signal line 150 can send a valve timing control signal to unit 136 and receive a cam timing measurement. Likewise, signal line 152 can send a valve timing control signal to unit 138 and receive a cam timing measurement.

As described above, FIG. 1 merely shows one cylinder of a multi-cylinder engine, and that each cylinder has its own set of intake/exhaust valves, fuel injectors, spark plugs, etc. In an alternative embodiment, a port fuel injection configuration may be used where a fuel injector is coupled to intake manifold 44 in a port, rather than directly to cylinder 30.

Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio Humidity sensing may also be employed in connection with the depicted embodiments. For example, an absolute, or relative, humidity sensor (140) may be used for measuring humidity of the ambient air or intake air. This sensor can be located either in the inlet air stream entering manifold 44, or measuring ambient air flowing through the engine compartment of the vehicle, for example. Also note that humidity may be estimated or inferred based on various operating parameters, such as barometric pressure. Alternatively, humidity can be inferred based on auto-ignition characteristics via adaptive learning. Further, barometric pressure and adaptive learning can be used in combination, and may also be used with sensed humidity values.

As will be described in more detail below, combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for auto-ignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled auto-ignition (CAI), where auto-ignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of auto-ignition. The initial intake charge temperature directly affects the timing of auto-ignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that auto-ignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbo-charging and supercharging), changing the auto-ignition characteristics of the fuel provided to the engine, and heating the intake air charge (external EGR).

During HCCI combustion, auto-ignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an auto-ignition temperature should have been attained, may be utilized as a backup ignition source in the case that auto-ignition does not occur.

A third type of combustion that may be performed by engine 10, such as in the case where a spark device is included, utilizes the sparking device to initiate (or assist) combustion when the temperature of the combustion chamber gas approaches an auto-ignition temperature (e.g., reaches a level substantially near auto-ignition without achieving combustion). Such a spark assist type of combustion can exhibit increased fuel efficiency and reduce NOx production over that of SI combustion, yet may operate in a higher torque range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on spark timing to provide the final energy needed to attain auto-ignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate auto-ignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine torque requirements, spark assist may be activated to ensure proper combustion timing. As the engine is returned to a low or moderate torque requirement, the involvement of spark assist may cease in order to realize the full benefits of HCCI.

As noted above, ambient humidity of air drawn into the engine during the intake stroke may affect combustion temperature via dilution of the charge with material that cannot be oxidized and because the specific heat of water is higher than air. Thus, as humidity increases, to attain a desired auto-ignition timing, initial charge temperature should be adjusted in accordance with humidity levels. For example, use of humidity sensing or estimation may thus enable improved adjustments to a plurality of engine operating parameters to aid in achieving or maintaining HCCI combustion, even when a vehicle may experience varying levels of ambient humidity. Thus, increasing humidity may require higher initial temperatures and lower humidity may require lower initial temperature for a given auto-ignition timing at a given speed and torque.

The ambient humidity of air drawn into the engine during the intake stroke also affects peak combustion temperatures because it has a higher specific heat than air, the more common diluent. As the ambient humidity of the air drawn into the engine during the intake stroke increases, the peak combustion temperature is decreased via dilution of the charge with material that cannot be oxidized and subsequently raises the required initial charge temperature to attain efficient HCCI combustion. The ambient or relative humidity can be determined using sensors 140 and/or 141 or may be inferred from other data and passed on to engine controller 12 to determine the ideal adjustments to engine control parameters for efficient operation.

Note that a plurality of other parameters may affect both the peak combustion temperature and the required temperature for efficient HCCI combustion. These and any other applicable parameters may be accounted for in the routines embedded in engine controller 12 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on auto-ignition, i.e., the effect of water makes auto-ignition less likely.

While one or more of the above combustion modes may be used in some examples, still other combustion modes may be used, such as stratified operation, either with or without spark initiated combustion.

As noted herein, in one example of a compression or auto-ignition capable engine, the intake valve(s) is (are) actuated either by a high or low lift cam profile depending on the selected combustion mode. The low lift cam profile is used to trap a high level of residual (exhaust) gas in the cylinder. The trapped gasses promote compression or auto-ignition by increasing the initial charge temperature, in some examples. However, in a spark ignition mode (either high or low loads) the high lift cam profile is used. Such a switchable cam profile may be achieved through various cam and tappet systems that switch between an inner and outer land, for example. The switching may be achieved through oil flow hydraulic actuators, which may necessitate a higher flow oil pump, thereby potentially increasing weight and cost and reducing efficiency (e.g., a higher flow oil pump may result in higher parasitic loss due to increased oil volume and potential issues related to a lack of sufficient flow in the oilways). As another example, such systems may involve an increased number of tappets as well as increased machining costs.

Thus, in another embodiment, rather than using a cylinder with a single intake valve (or multiple switchable intake valves) that changes between different profiles, a cylinder with at least two intake valves, where each of the valves has a different lift profile (at least for that cylinder), may be used. During the compression or auto-ignition, a higher and/or longer lift intake valve can be disabled through the use of a collapsible tappet, while a lower and/or shorter lift intake valve remains active. During spark ignition, the higher/longer lift intake valve can operate to increase the airflow into the engine, while the lower/shorter lift continues to operate.

Due to the fact that, in this example, only half of the valves now need to be switched, the oil flow requirements for the valve actuation is significantly reduced, thereby reducing the overall oil flow requirements of the engine system. Considering the valve harder, in this example, only half the tappets are switchable units and the camshaft may be made with a lower cost manufacturing process with considerably less machining. Further, the oil pump can have a lower working flow rate, reducing cost, and lower parasitic losses. In this way, system cost can be decreased while still providing both spark and compression or auto-ignition, along with transitions therebetween.

Active valve operation may refer to the valve opening and closing during a cycle of the cylinder, where deactivated valves may be held in a closed position for a cycle of the cylinder (or held in a fixed position for the cycle).

While the above examples illustrate the advantages of a particular situation, the approaches herein can be applied to a variety of different systems and configurations, such as to exhaust systems, as well as systems have more than two intake or two exhaust valves per cylinder.

Returning to an example intake valve system, the first intake valve can have a lower lift profile, capable on its own of flowing sufficient air to operate the engine in compression or auto-ignition. Further, the first intake valve can have a valve timing (fixed or adjustable) set for compression or auto-ignition. The second intake valve can have a valve lift and/or timing (fixed or adjustable) that provides the balance of the air for spark-ignition, over and above the air required for compression or auto-ignition, as illustrated in the example of FIG. 3.

Valve deactivation may be provided via switchable tappets fitted to a higher/longer lift valve, which in one example is active only during spark-ignition operation. During compression or auto-ignition, the tappet may deactivate to leave the higher/longer lift valve closed during a cycle of the cylinder. The lower/shorter lift valve can be permanently active to open and close during a cycle of the cylinder to provide either all the air during compression or auto-ignition, or part of the air for spark ignition.

However, in another embodiment, a higher/longer lift intake valve may also be deactivated under conditions other than compression or auto-ignition, such as during vehicle deceleration to reduce airflow during deceleration fuel shutoff, or other conditions. Furthermore, different valves have been denoted as having a higher or shorter lift, which may be identified by a maximum valve lift or an average valve lift height (opening into the cylinder). Likewise, valves with a shorter or longer lift may be identified by a crank angle opening duration, for example, even though the valves may open and/or close earlier or later during the cylinder cycle.

Figure 3:
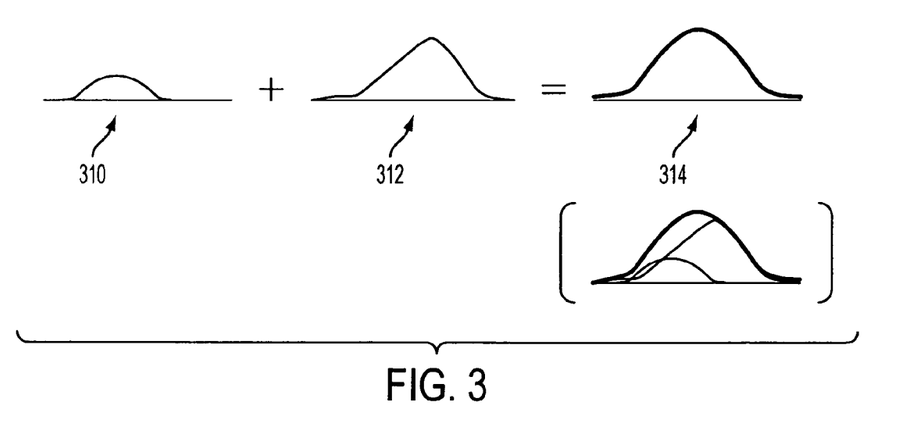
FIG. 3 illustrates example lift profiles.

Referring now to FIG. 2A, it shows an example cylinder configuration where two intake valves (52a and 52b) of cylinder 30 of engine 10 are actuated via a common camshaft 130, with each having a different cam profile 210 and 212, examples of which are described in more detail with regard to FIG. 3. The figures show valve 52a having a longer and higher valve lift profile than 52b. In this example, valve 52b is actuated via a tappet 216, while valve 52b is actuated by a collapsible tappet 214, which may be controlled via controller 12.

FIG. 2A also shows two exhaust valves 54a and 54b, also actuated via profiles 220 and 222 through tappets 224 and 226, where tappet 224 may be deactivatable via controller 12. In this example, valve 54a is shown having a longer and higher valve lift than valve 54b.

While this example shows an overhead cam engine with a tappet coupled to the valve stems, tappets may also be used with a pushrod engine, and a collapsible tappet may thus be coupled to a pushrod.

Further, the diagram of FIG. 2A shows just one cylinder of engine 10, where the engine may be a multiple cylinder engine with each cylinder the same as, similar to, or different from the one shown in FIG. 2A. Further, while the above valve system can provide advantages in an engine having compression or auto-ignition, it may also be used in other engine combustion systems.

Referring now to FIG. 2B, it shows an alternative camshaft and tappet configuration. Specifically, in this example, the lift profile 210 is divided into lift portions 210A and 210C and zero lift portion 210B. During active valve operation, tappet 284 is actuated as a unit by profiles 210A and 210C, and during deactivation, an outer portion of 284 is decoupled from an inner portion as described in FIG. 2C, so that valve 52a is not activated. Likewise, lift profile 220 is similarly divided, and tappet 294 is similar to tappet 284. Thus, an alternative approach for deactivation is shown that may provide improve manufacturability, for example. Also note that a single profile, such as 210A, may be used, rather than the double profile (210A and 210C) shown.

Figure 2C:
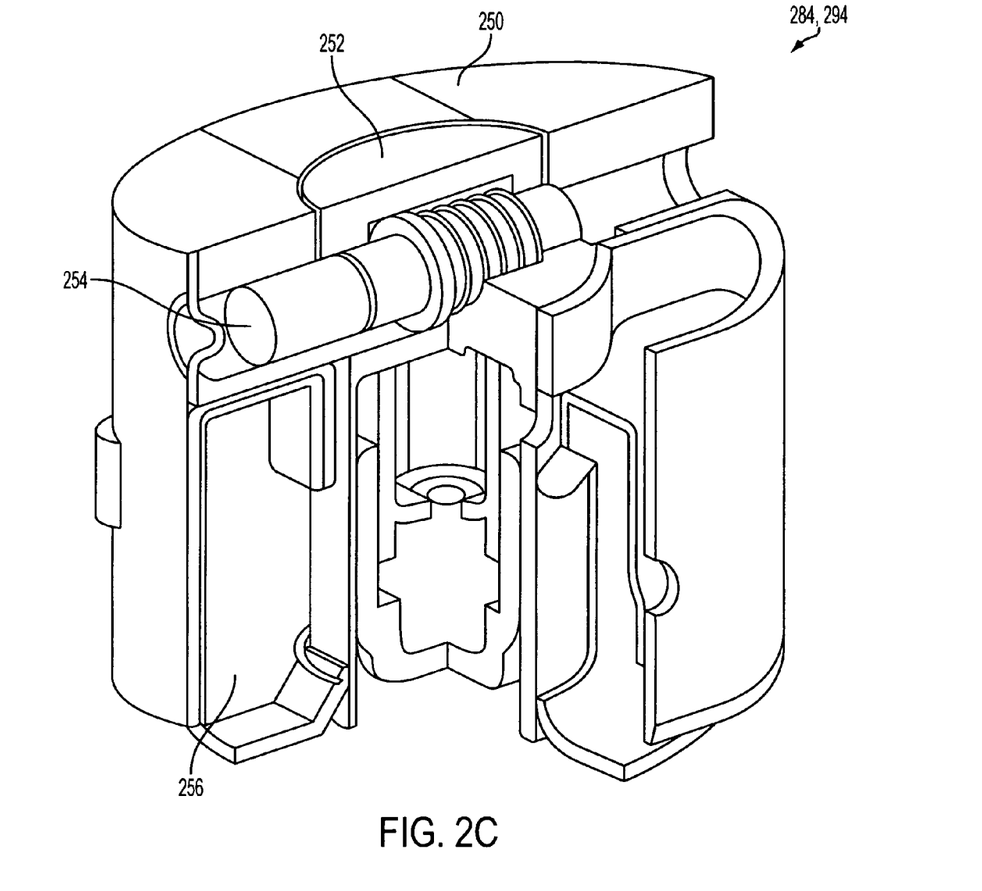
FIG. 2C shows an example detail view of a tappet for use with the example of FIG. 2B.

Specifically, FIG. 2C shows an alternative deactivatable tappet in which locking pin 254 is used to couple or decouple inner portion 252 from outer portion 250. In this way, when the pin is in the locked position, the motion caused by the contact with profiles 210A and 210C causes the inner portion to follow the motion and thus actuate the valve stem and valve coupled to the inner portion. Alternatively, when the pin is the unlocked position, a lost motion spring in interior section 256 causes outer portion 250 to travel separate from inner portion 252. Further, because profile 210B, which is in contact with the inner portion 252, has reduced lift or no lift, the valve remains substantially closed and thus the cylinder may be deactivated. The pin 254 may be actuated via hydraulic pressure controlled via a hydraulic valve communicating with the controller, in one example.

In this way, an alternative approach using a deactivatable tappet may be used in which manufacturability of the tappet may be increased, while still retaining the desired action.

Finally, still other examples of valve deactivation may be used, if desired.

Referring now to FIG. 3, it shows at 310 an example lift profile of valve 52b which profile may be used to provide a desired fresh air charge and residual charge to improve compression or auto-ignition, such as by providing a higher initial charge temperature at the start of compression. As noted herein, in one example, valve 52b does not have a deactivation mechanism. FIG. 3 also shows at 312 an example lift profile of valve 52a, which profile may be used to provide a desired operation for spark ignition operation. In the example of FIG. 3, profile 312 has some lift portions that are higher than that of 310, and also a longer lift than that of 310. As noted herein, valve 312 may be selectively deactivated during compression or auto-ignition operation via a deactivatable tappet.

When both intake valves are active, an effective lift profile as illustrated by 314, may be achieved, whereas the profile 310 controls during compression or auto-ignition, at least in one example.

The above example embodiments and alternatives may be used to transition one or more cylinders of an engine between combustion modes. However, to reduce torque fluctuations, emission spikes and NVH during a switch, it may be important to know when each tappet has switched so that the correct amount of fuel can be injected into the respective cylinder. One approach may be to measure switches at the tappet, which may utilize additional sensors and other systems that can increase system cost. Another approach is to infer a switched tappet from in-cylinder pressure measurements of the compression immediately following a switch.

As noted above, a switchable tappet mechanism can be used which includes a pin that slides into a locked or unlocked position depending on the oil pressure exerted on the pin. The exact position when each tappet switches may be highly dependent upon the dynamics of the oil circuit. Furthermore, in a particular tappet, if a valve is open and the oil pressure switch threshold is reached, the lock pin may not move until the valve has fully closed and the changed valve lift will not occur until the next valve event. Also, if the lock pin has started to move and a valve event occurs before the pin has fully engaged or disengaged, then the pin may degrade. These factors, along with other aging and degradation effects, make robust control of the tappet switch timing and switching order an important consideration.

One approach, which in the following embodiments is applied to a four cylinder engine, uses an oil circuit configuration that reduces complexity but provides a system with sufficient repeatability and robustness and sufficient variability to handle a variety of operating conditions where the cylinder switching order can be pre-defined and robustly achieved.

Figure 4:
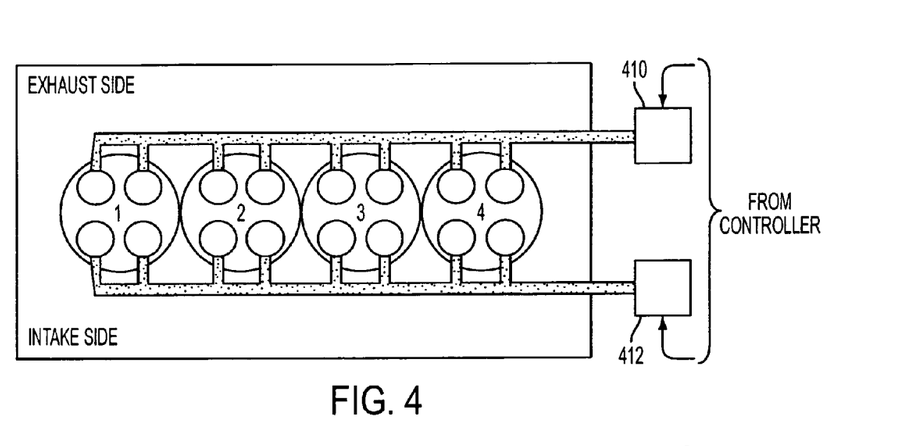
FIGS. 4-5 show example hydraulic actuator circuits for controlling actuation of multi-cylinder valve actuator systems.

With reference to FIG. 4, a first example configuration is described using a first hydraulic actuator 410 and a second hydraulic actuator 412, controlling respective oil pressures to actuators in cylinders one through four as indicated. In this example, the engine firing order is 1-3-4-2, although this is just one example. Continuing with FIG. 4, the two actuators each utilize separate oil galleries for each of the intake tappets and exhaust tappets. This configuration allows independent control of each group of the intake and exhaust valves and enables sufficient switching windows for a pre-defined cylinder switching order for both intake and exhaust valves to be achieved, as described in more detail below with regard to FIGS. 6 and 7. As illustrated, it is possible with such a system to achieve a cylinder switching order that is the same for both the intake and exhaust tappets. In other words, because the cam event switching windows used to achieve both an acceptable robust switch in a pre-defined cylinder switch order do not coincide for the intake and exhaust sides, separate control for intake and exhaust valves of multiple cylinders may be used to obtain the desired switch order.

Figure 5:
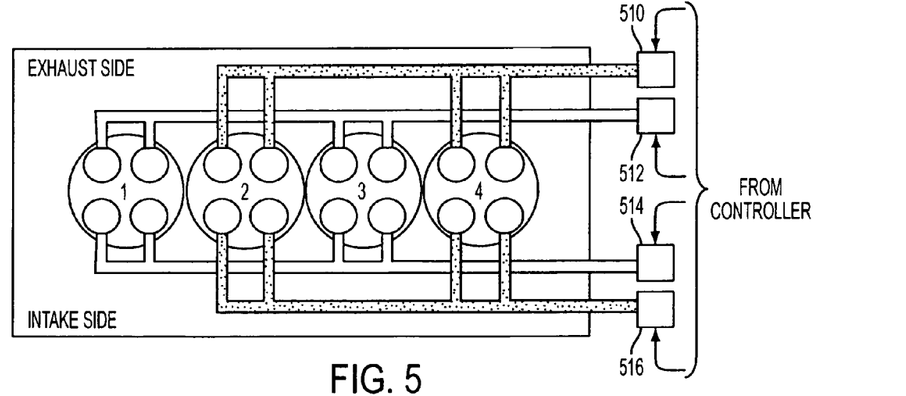

However, in an alternative embodiment, further improvements to robust control may be achieved with the oil circuit configuration of FIG. 5. In this embodiment, the oil circuit uses four actuators (510, 512, 514, and 516) to control the oil pressure in four separate oil galleries. Again, the configuration of FIG. 5 uses a cylinder firing order of 1-3-4-2.

Note that the above approaches may be adapted and/or modified to accommodate alternative firing orders. For example, the oil galleries can be reconfigured to achieve the same or another desired outcome, such as by connecting any two subsequent cylinders in the firing sequence to the same oil gallery. Note that in the above example, the figures show an engine with a single bank of four cylinders. However, the approach may be extended to a V-8 engine, for example, with two engine banks, each having four cylinders. In this case, the firing order of the cylinders of the particular bank may be used to configure the oil galleries, even though the overall engine firing order may switch periodically between banks. In other words, cylinder 3 may fire consecutively after cylinder 1 among the cylinders in the particular bank shown, even though a cylinder in another bank may fire between cylinders 1 and 3.

Figure 8:
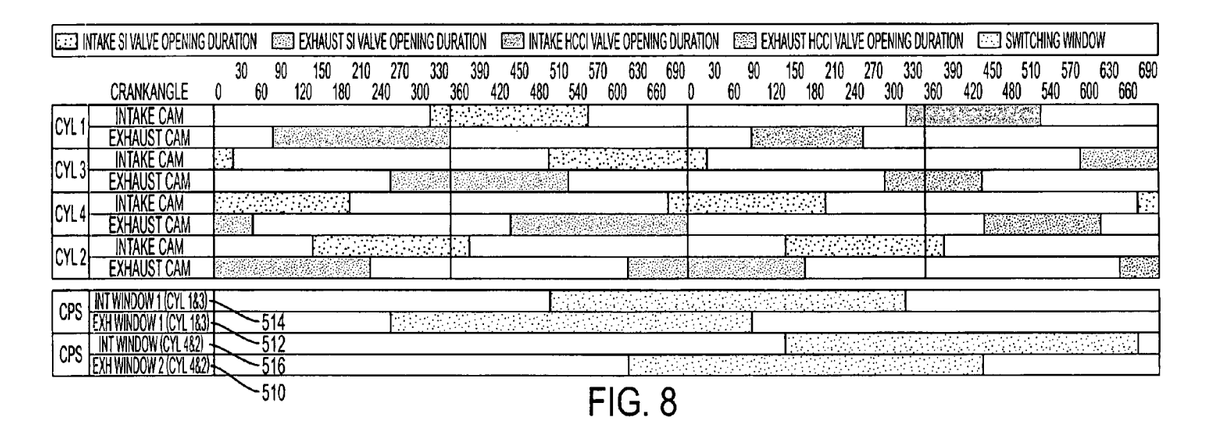
FIGS. 8-9 show example timing diagrams and timing windows for the example configuration of FIG. 5.
Figure 9:
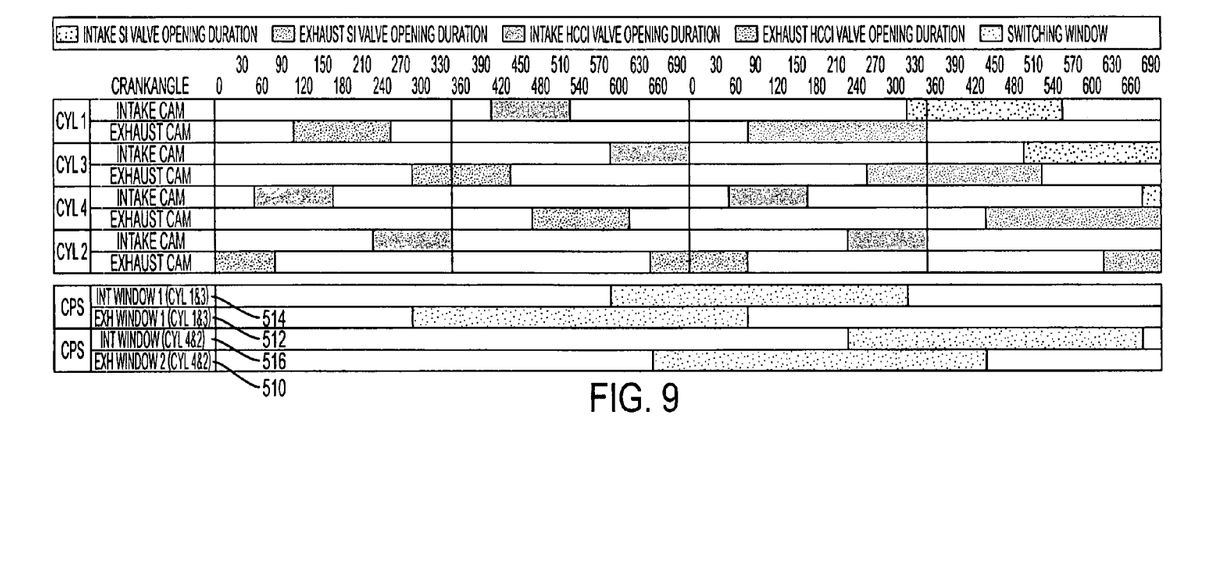

The above configurations may be used to extend the switching window for actuating the valve changing mechanism to values typically in the order of 220 to 270 crank angle degrees, corresponding to an increased range of 6.1 to 7.5 ms at 6000 rpm. A timing diagram illustrating the embodiment of FIG. 5 is illustrated in FIGS. 8 and 9 which show schematic cam event timing charts and the safe switching windows for a switch from SI to HCCI and vice versa respectively.

Figure 6:
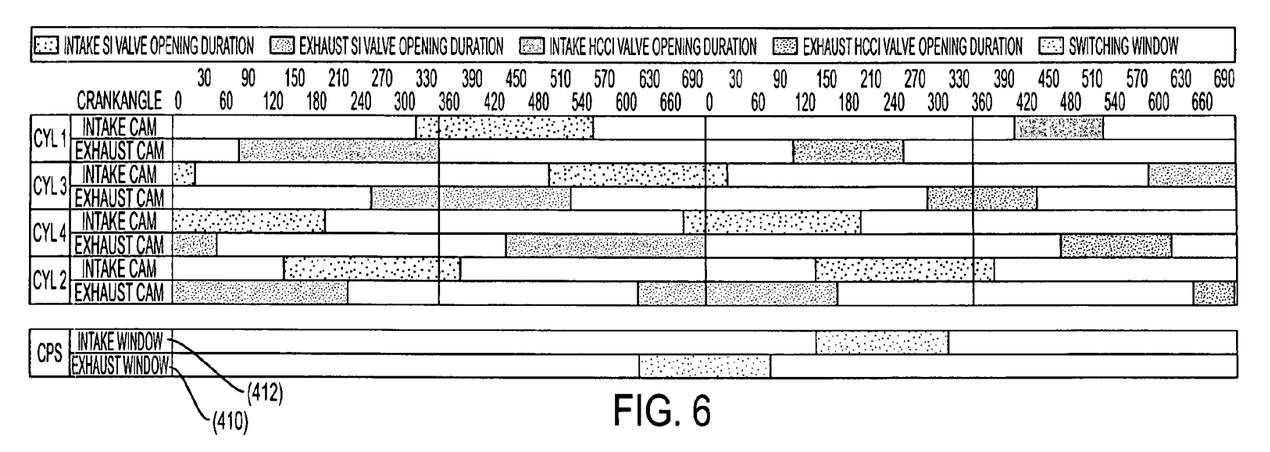
FIGS. 6-7 show example timing diagrams and timing windows for the example configuration of FIG. 4.
Figure 7:
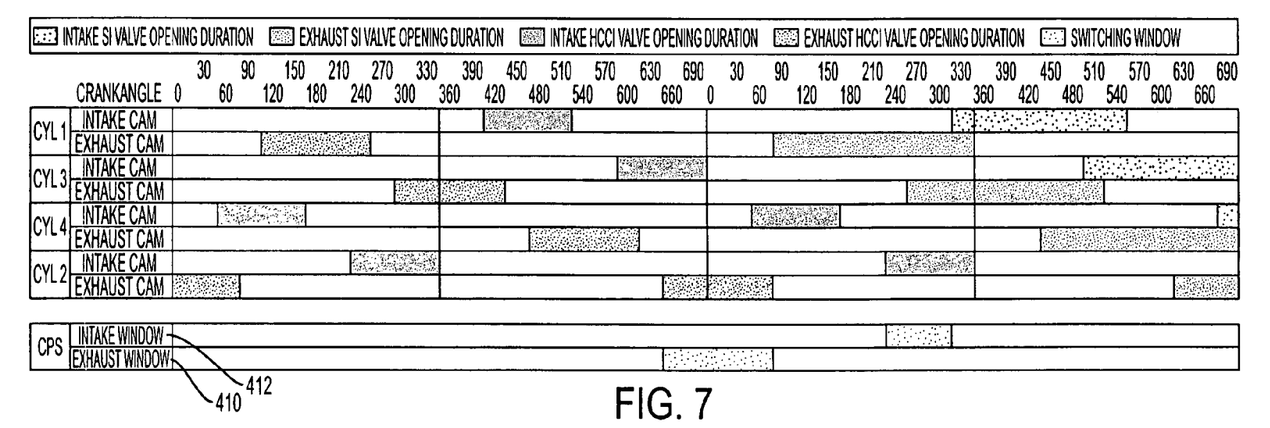

Referring now specifically to FIGS. 6-7, schematic cam event timing charts for the configuration of FIG. 4 (four cylinder engine with a cylinder firing order of 1-3-4-2) are shown for a switch from high lift long duration SI to low lift short duration HCCI, and vice versa, respectively. Specifically, the Figures show the intake and exhaust valve opening durations for each of the cylinders. Further, a cam profile switch (CPS) window is shown for each of actuators 410 and 412.

The CPS window shows the range of crank angles over which a signal may be sent to the actuator to initiate a switch in valve operation. The beginning and ending regions of the windows are defined by the firing order, valve opening durations, etc. For the example mode switch starting with cylinder number 1, the beginning of the exhaust signal window is defined to be after the opening angle of the exhaust valve for cylinder 2 and the end is before the exhaust valve opening angle of the high lift cam for cylinder 1 (shown by the dashed line on the exhaust cam opening window of cylinder 1). Also note that in this example, the switch is controlled so that for the last combustion event in the SI mode, the exhaust lift profile is that of the HCCI type, and the first combustion event in the HCCI mode uses an intake lift profile of the HCCI type.

Continuing with FIG. 6, for the example mode switch starting with cylinder number 1, the beginning of the intake signal window is defined to be after the opening angle of the intake valve for cylinder 2 and the end is before the intake valve opening angle of the high lift cam for cylinder 1 (shown by the dashed line on the intake cam opening window of cylinder 1).

Conversely, FIG. 7 shows a transition from HCCI to SI operation, and the corresponding windows for such operation. Note that the window start angles, end angles, and/or durations may be different from those of FIG. 6. This may be due to, for example, the different valve opening timings and durations between the different lift profiles.

Like the example of FIG. 6, the respective intake and exhaust windows of FIG. 7 are keyed to the intake and exhaust valve timings of the cylinders firing immediately before the switch and immediately after the switch in the firing order of the cylinders in the particular engine bank or group of cylinders having a common camshaft. However, in this example, no dashed lines are needed as the valve openings shown determine the windows in the same manner as in FIG. 6.

Depending on the base engine cam timing and duration, the windows may be on the order of 150 crank angle degrees for switching from SI to HCCI and typically on the order of 50 crank angle degrees for switching from HCCI to SI. At 6000 rpm this corresponds to a range of 1.4 to 4.2 ms, which may require precise control, especially when taking into account aging and degradation effects of the oil and oil system. However, if the switching engine speed window is limited to lower speeds, increased robustness may be achieved.

Referring now to FIGS. 8-9, schematic cam event timing charts for the configuration of FIG. 5 (four cylinder engine with a cylinder firing order of 1-3-4-2) are shown for a switch from high lift long duration SI to low lift short duration HCCI, and vice versa, respectively. Specifically, the Figures show the intake and exhaust valve opening durations for each of the cylinders. Further, a cam profile switch (CPS) window is shown for each of actuators 510 through 516.

The CPS windows show the range of crank angles over which a signal may be sent to the actuator to initiate a switch in valve operation. The beginning and ending regions of the windows are defined by the firing order, valve opening durations, etc. For the example mode switch starting with cylinder number 1, the beginning of the exhaust signal window for cylinders 1 and 3 is defined to be after the opening angle of the exhaust valve for cylinder 3 and the end is before the exhaust valve opening angle of the high lift cam for cylinder 1 (shown by the dashed line on the exhaust cam opening window of cylinder 1). Again, in this example, the switch is controlled so that for the last combustion event in the SI mode, the exhaust lift profile is that of the HCCI type, and the first combustion event in the HCCI mode uses an intake lift profile of the HCCI type.

Continuing with FIG. 8, for the example mode switch starting with cylinder number 1, the beginning of the intake signal window for cylinders 1 and 3 is defined to be after the opening angle of the intake valve for cylinder 3 and the end is before the intake valve opening angle of the high lift cam for cylinder 1 (shown by the dashed line on the intake cam opening window of cylinder 1). A similar analysis applies for the windows of cylinders 2 and 4, except that the beginning of the exhaust signal window for cylinders 2 and 4 is defined to be after the opening angle of the exhaust valve for cylinder 2 and the end is before the exhaust valve opening angle of the high lift cam for cylinder 4 (shown by the dashed line on the exhaust cam opening window of cylinder 4). Further, the beginning of the intake signal window for cylinders 2 and 4 is defined to be after the opening angle of the intake valve for cylinder 2 and the end is before the intake valve opening angle of the high lift cam for cylinder 4 (shown by the dashed line on the intake cam opening window of cylinder 4).

Conversely, FIG. 9 shows a transition from HCCI to SI operation, and the corresponding windows for such operation. Note that the window start angles, end angles, and/or durations may be different from those of FIG. 8. This may be due to, for example, the different valve opening timings and durations between the different lift profiles.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. As another example, various other mechanisms may be used in a system using two different valve profiles for each of the valves in a cylinder, and the selective deactivation of one or more valves to provide the correct flow conditions for compression or auto-ignition combustion. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method controlling combustion modes of an engine with at least a first and second cylinder, the engine having a controller, a first actuator configured to control at least intake valves of the first and second cylinder, and a second actuator configured to control at least exhaust valves of the first and second cylinders, the method comprising:
   sending a first signal from the controller to the first actuator which adjusts operation of at least intake valves of the first and second cylinder and a second signal from the controller to the second actuator which adjusts operation of at least exhaust valves of the first and second cylinder, said first and second signals sent at different crank angles; and
   transitioning combustion modes of said first and second cylinders, said combustion modes including spark ignition and homogeneous charge compression ignition.

2. The method of claim 1 wherein said second signal is sent before said first signal.

3. The method of claim 2 wherein said first signal changes effective intake valve lift and valve timing, and said second signal changes effective exhaust valve lift and valve timing.

4. The method of claim 3 wherein said second signal is sent before an exhaust valve opening of the first cylinder and during an exhaust valve opening of the second cylinder, and wherein said first signal is sent before an intake valve opening of the first cylinder and during an intake valve opening of the second cylinder.

5. The method of claim 4 wherein said first actuator activates and deactivates an intake valve and said second actuator activates and deactivates an exhaust valve.

6. The method of claim 1 wherein a crank angle range in which said first signal is sent varies depending on whether the first and second cylinders are transitioning from homogeneous charge compression ignition to spark ignition or from spark ignition to homogeneous compression ignition.

7. The method of claim 1 wherein the first and second cylinders are on a common bank, and the second cylinder fires consecutively after said first cylinder in a firing order of cylinders on said common bank.

8. A method controlling combustion modes of an engine with at least four cylinders in a bank, the engine having a controller, a first actuator configured to control at least intake valves of the first and second cylinder, a second actuator configured to control at least exhaust valves of the first and second cylinder, a third actuator configured to control at least intake valves of the third and fourth cylinder, a fourth actuator configured to control at least exhaust valves of the third and fourth cylinder, the method comprising:
   sending a first signal from the controller to said first actuator;
   sending a second signal from the controller to said second actuator;
   sending a third signal from the controller to said third actuator;
   sending a fourth signal from the controller to said fourth actuator;
   where at least said second signal and said third signal are sent at different crank angles; and
   transitioning combustion modes of said four cylinders, said combustion modes including spark ignition and homogeneous charge compression ignition, where said second cylinder fires consecutively after said first cylinder and said fourth cylinder fires consecutively after said third cylinder in a firing order of cylinders in the bank.

9. The method of claim 8 wherein said first signal changes effective intake valve lift and valve timing, and said second signal changes effective exhaust valve lift and valve timing.

10. The method of claim 8 wherein said first signal is sent after initial opening of an intake valve in the first cylinder but before initial opening of an intake valve in the second cylinder, said second signal is sent after initial opening of an exhaust valve in the first cylinder but before initial opening of an exhaust valve in the second cylinder, said third signal is sent after initial opening of an intake valve in the third cylinder but before initial opening of an intake valve in the fourth cylinder, and said fourth signal is sent after initial opening of an exhaust valve in the third cylinder but before initial opening of an exhaust valve in the fourth cylinder.

11. A method for operating an engine of a vehicle, the engine having at least a first and second cylinder, each with at least a first and second valve, the method comprising:

during a first mode, operating the first and second cylinders with the first valve active and the second valve deactivated during a cycle of the first and second cylinders, where during said first mode, the first and second cylinders operate to allow at least air to enter the first and second cylinders during an intake stroke, where the air is mixed with fuel and compressed to attain auto-ignition;

during a second mode, operating the first and second cylinders with the first and second valves active during a cycle of the first and second cylinders, where during said second mode, the first and second cylinders operate to allow at least air to enter the first and second cylinders, where the air is mixed with fuel and ignited via a spark from an ignition plug; and during a transition between said first and second modes, sending a first signal to a first actuator to adjust activation or deactivation of said second valve in each of the first and second cylinders.

12. The method of claim 11 wherein the first and second valves are intake valves, and wherein during a transition from said first mode to said second mode, said second intake valve is activated and the first intake valve is maintained active, and where the first and second cylinders further have a first and second exhaust valve, where during said first mode, the first exhaust valve is active and the second exhaust valve is deactivated, and during the second mode, both said first and second exhaust valves are active during a cycle of the first and second cylinders.

13. The method of claim 12 further comprising during a transition between said first and second modes, sending a second signal to a second actuator to adjust activation or deactivation of said second exhaust valve in each of the first and second cylinders, where said second signal is sent at a different crank angle than said first signal.

14. The method of claim 13 wherein a lift profile of said second intake valve is longer than a lift profile of said first intake valve, and where a single cam actuates both said first and second intake valves.

* * * * *